(12) United States Patent
Moody, II et al.

(10) Patent No.: US 6,804,753 B1
(45) Date of Patent: Oct. 12, 2004

(54) PARTITIONED LIBRARY

(75) Inventors: William H. Moody, II, Austin, TX (US); John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

(21) Appl. No.: 10/065,329

(22) Filed: Oct. 4, 2002

(51) Int. Cl.$^7$ .............................................. G06F 12/00
(52) U.S. Cl. ..................... 711/163; 711/129; 711/151; 711/152; 711/153; 711/163; 711/170; 711/173; 709/215
(58) Field of Search ................................ 711/129, 151, 711/152, 153, 163, 170, 173; 709/215

(56) References Cited

U.S. PATENT DOCUMENTS 6,295,575 B1 * 9/2001 Blumenau et al. ............. 711/5
6,425,059 B1 * 7/2002 Basham et al. ............. 711/153
2002/0099901 A1 * 7/2002 Tanaka et al. ................. 711/6
2003/0014600 A1 * 1/2003 Ito et al. ..................... 711/152

* cited by examiner

*Primary Examiner*—Nasser Moazzami
*Assistant Examiner*—Bao Q. Truong
(74) *Attorney, Agent, or Firm*—Sprinkle IP Law Group

(57) ABSTRACT

Systems and methods for preventing conflicts in a media library system, wherein multiple hosts may attempt to access the same element (e.g., cartridge slot) at the same time. A plurality of pools are defined, each of which is associated with a corresponding subset of the hosts and a corresponding subset of the elements in the library. It is assumed that all of the hosts associated with a given pool have compatible software applications or some other means for preventing or resolving conflicts among them. Each host is then allowed to access only the subset of the elements in the library that are associated with the same pool as the host so no conflicting access commands are transmitted to the media library.

38 Claims, 7 Drawing Sheets

PARTITIONED LIBRARY

BACKGROUND OF INVENTION

1. Field of the Invention

The invention relates generally to computer systems and more particularly to systems and methods for preventing conflicts in a media library system, wherein multiple hosts may attempt to access the same medium at the same time.

2. Background of the Invention

Computer systems may utilize various media to store information. Data that is currently being processed is typically stored in the computers' RAM. Storage of data in RAM is, however, temporary and the amount of data that can be stored in RAM is limited. Data that is not currently being processed by a computer may have to be stored elsewhere. For example, hard disk drives are typically installed in workstations to provide persistent storage for larger amounts of data.

Even larger amounts of data may be maintained on separate storage devices that are coupled to the computers. These storage devices may include more expensive disk drives with greater capacity than internal drives or, if the data need not be accessed quickly, tape drives or other removable-media devices can be used. Typically, these devices are employed in a network environment, where they can be used by a number of workstations. The storage devices may form what is referred to as a storage area network (SAN).

When a removable-media device such as a tape drive is used, the storage capacity is limited only by the number of tapes that are available. The tape drive system may therefore be considered a tape library. The tapes are typically contained in tape cartridges. The tape library typically contains multiple cartridge slots in which tape cartridges can be stored. In an automated tape library system, the tapes are physically moved between cartridge slots and tape drives by a robotic mechanism. This mechanism is controlled by access commands received from the host devices on the network. When specific data is desired, the host device determines which cartridge slot contains the tape that holds the desired data. The host device then transmits a move-element or exchange-element command to the tape library. In response to the move-element or exchange-element command, the robotics controller moves the tape cartridge from the specified cartridge slot to the specified tape drive. The tape drive, under control of the application, then advances (or rewinds) the tape to the appropriate location, reads the data and returns the data to the host device. Data is written to the tapes in a similar fashion.

The operation of the tape library system gives rise to potential problems. For instance, two or more hosts may attempt to access the same cartridge slot at the same time, but for data at different locations on the tape. In this situation, there is a conflict and the tape library system must somehow resolve the issue of which host's access request the system will respond to. The conflict becomes even more apparent when the tape library system has more than one tape drive. The system then has to resolve not only the question of which access request to respond to, but also which tape drive the tape should be loaded into.

These issues may be dealt with in software if the hosts use the same application or at least compatible applications. For example, if two hosts use the same backup application to store their data to tape, the application can coordinate the access requests of the two hosts so that both are backed up to the tape library. If, on the other hand, the two hosts use different backup applications, the applications will most likely not be able to coordinate their actions to ensure that both of the hosts are properly backed up, since they were probably independently designed and are consequently incompatible.

Because networks often include host devices that run different, incompatible applications, it would be desirable to provide a mechanism for coordinating their functions in relation to the accessing of cartridge slots within media libraries, or at least resolving the potential conflicts that may arise.

SUMMARY OF INVENTION

One or more of the problems outlined above may be solved by the various embodiments of the invention. Broadly speaking, the invention comprises systems and methods for preventing conflicts in a media library system, wherein multiple hosts may attempt to access the same element (e.g., cartridge slot) at the same time. This is accomplished by defining a plurality of pools, each of which is associated with a corresponding subset of the hosts and a corresponding subset of the elements in the library. It is assumed that all of the hosts associated with a given pool have compatible software applications or some other means for preventing or resolving conflicts among them. Each host is then allowed to access only the subset of the elements in the library that are associated with the same pool as the host.

It should be noted that the term "element" is used throughout this disclosure to refer to cartridge slots (storage elements) and slots used to insert or withdraw cartridges (import/export elements) in the tape library systems described herein. In other embodiments, the elements may be different types of media or media slots. These types of elements (slots) may be partitioned or assigned to pools as described below.

One embodiment of the invention comprises a device that operates as a filter and is configured to be located between a SAN and a tape library. The device comprises a controller that is coupled to a memory, a buffer, and two interfaces. One interface is configured to be coupled to a first transport medium, such as a Fibre Channel fabric of a SAN. The other interface is configured to be coupled to the tape library. Access commands directed to the tape library are received via the first interface and are stored in a buffer. The controller examines the received commands and determines whether to pass or reject the individual commands based upon configuration information stored in the memory. The configuration information defines the relationships between the pools and the hosts and tapes with which they are associated. If the controller determines that a received access command is targeted to an element that is associated with the same pool as the host that generated the command, the controller passes the command from the buffer through the second interface to the tape library. (The controller may be required to modify the command, depending upon its type.) If the controller determines that the received command is not targeted to an element that is associated with the same pool, the command is discarded. In this case, the controller may be configured to return an error message to the host to notify it that the command was rejected.

In an alternative embodiment, the hosts cannot see all of the elements in the library, but can only see (and access) those in the same pool. In this embodiment, a library partitioning device can be configured to control access to the elements by mapping a set of logical or virtual elements to a corresponding set of physical elements. In this embodiment, the hosts only see the set of elements that they are authorized to access (i.e., the ones in the same pool). Different hosts may thereby access what is seen by each as the same element, when in reality, each host is accessing a different element (assuming the hosts are associated with different pools).

Another alternative embodiment of the invention comprises a method for resolving conflicts among hosts that may attempt to access the same element in a tape library at the same time. In this method, each of the hosts coupled to the library is first assigned to (or associated with) a particular pool. Each pool may have multiple hosts associated with it. On the other hand, it may have a single host, or no host at all associated with it. Each host, however, is associated with only one pool. Each element is also assigned to one of the pools. More than one element may be assigned to a particular pool, or no elements may be assigned to that pool. Again, each element is assigned to only one pool. After the hosts and elements are associated with the appropriate pools, the hosts are allowed to access the elements in the pool with which they are associated. Other access requests are rejected.

Another embodiment of the invention comprises a software application. ("Software" is used herein to refer to program instructions, and is intended to include firmware.) The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional alternative embodiments are also possible.

BRIEF DESCRIPTION OF DRAWINGS

Other objects and advantages of the invention may become apparent upon reading the following detailed description and upon reference to the accompanying drawings.

Figure 1:
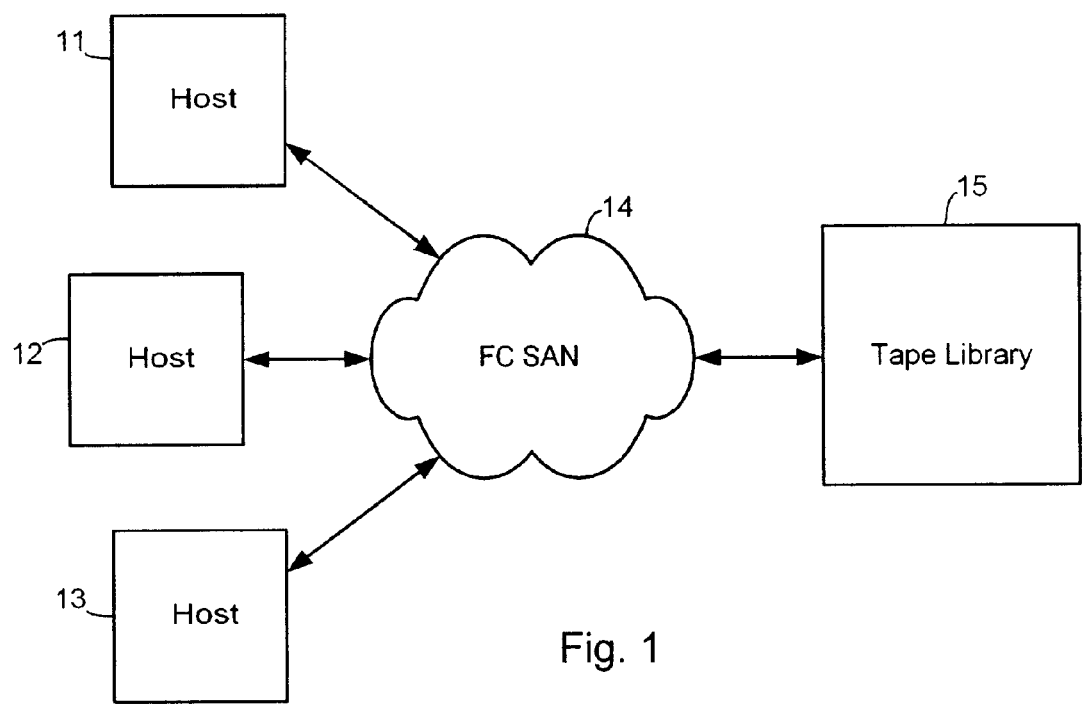
FIG. 1 is a diagram illustrating one embodiment of a system in which a plurality of hosts have access to a tape library.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for preventing conflicts in a media library system, wherein multiple hosts may attempt to access the same element at the same time. In a preferred embodiment, a plurality of hosts are coupled to a tape library through a Fibre Channel SAN. The tape library includes a plurality of tape drives and slots for tape cartridges and utilizes a robotic controller to load individual tapes into the tape drives. The hosts employ a plurality of different, incompatible backup applications. A library partitioning filter is coupled between the hosts and the tape library. The library partitioning filter maintains a list of pools to which the cartridge slots in the library belong, as well as a list of hosts that are associated with each of the pools. Each host is only allowed to access the cartridge slots in the pool with which the host is associated. In the preferred embodiment, a host is only allowed to "see" the cartridge slots to which it is allowed access. If one of the hosts attempts to access a cartridge slot that does not belong to the pool with which the host is associated, the access request is denied and is treated as if the requested cartridge slot does not exist in the library.

Referring to FIG. 1, a diagram illustrating one embodiment of a system in which a plurality of hosts have access to a tape library is shown. In this embodiment, hosts 11–13 are coupled to tape library 15 via Fibre Channel SAN 14. Each of the hosts can transmit access commands to the tape library to request that a tape cartridge from a particular cartridge slot be loaded into a tape drive so that data can be written to the tape or read from the tape.

Figure 2:
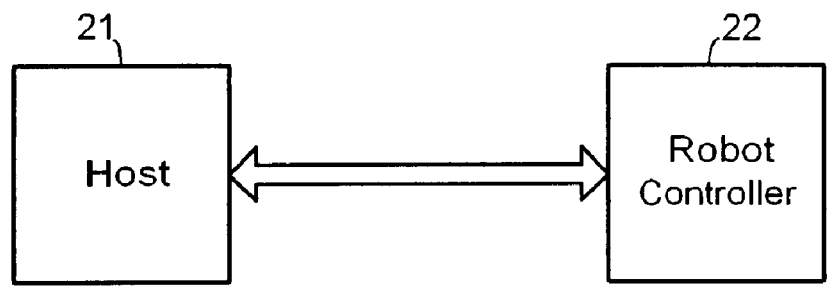
FIG. 2 is a diagram illustrating the command flow between a host and the robot controller of a media library in the prior art.

Referring to FIG. 2, a diagram illustrating the command flow between a host and the robot controller in the prior art is shown. In this figure, tape access commands flow directly from host 21 to controller 22. Responsive signals and data likewise flow directly from controller 22 to host 21. Because there is no intervening entity, all of the access commands transmitted by host 21 are received by controller 22, which attempts to execute them. Because it is assumed that the different hosts may have incompatible applications that are accessing the tape library, there is nothing to prevent two different hosts from sending access commands to the robot controller in an attempt to access the same cartridge slot. No means is provided in the prior art to resolve this conflict.

Figure 3:
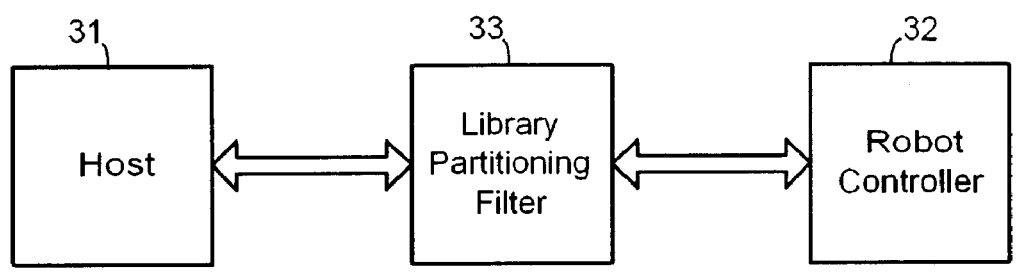
FIG. 3 is a diagram illustrating the command flow between a host and the robot controller in one embodiment of the invention.

Referring to FIG. 3, a diagram illustrating the command flow between a host and the robot controller in one embodiment of the invention is shown. In this figure, tape access commands do not flow directly from host 31 to controller 32. Instead, library partitioning filter 33 is interposed between host 31 and controller 32 so that commands from host 31 can be filtered prior to delivery to controller 32. The filtering performed by library partitioning filter 33 is designed to prevent the occurrence of conflicts of the type described above. Effectively, the conflicts are resolved by library partitioning filter 33 before they even arise.

Figure 4:
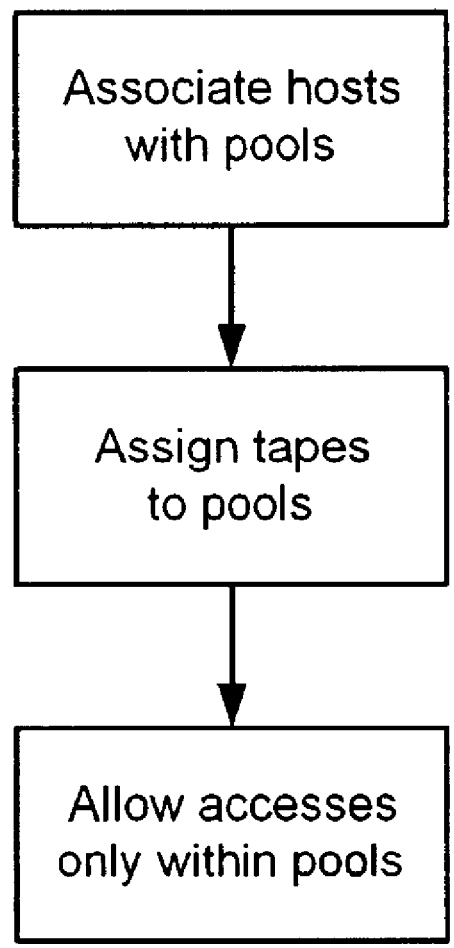
FIG. 4 is a flow diagram illustrating a basic method implemented by one embodiment of a library partitioning filter.

Referring to FIG. 4, a flow diagram illustrating the basic methodology implemented by the library partitioning filter is shown. As depicted in the figure, each of the hosts coupled to the library is first assigned to (or associated with) a particular pool. Each pool may have multiple hosts associated with it. On the other hand, it may have a single host, or no host at all associated with it. Each host, however, is associated with only one pool. Each cartridge slot is also assigned to one of the pools. More than one cartridge slot may be assigned to a particular pool, or no cartridge slots may be assigned to that pool. Again, each cartridge slot is assigned to only one pool. After the hosts and cartridge slots are associated with the appropriate pools, the hosts are allowed to access the cartridge slots in the pool with which they are associated. Other access requests are rejected.

In the preferred embodiment, the association of hosts with particular pools is based on the compatibility of the software applications that they use. For example, if a tape library is used for backup purposes, the hosts may be associated with pools based upon the particular applications they use.

Figure 5:
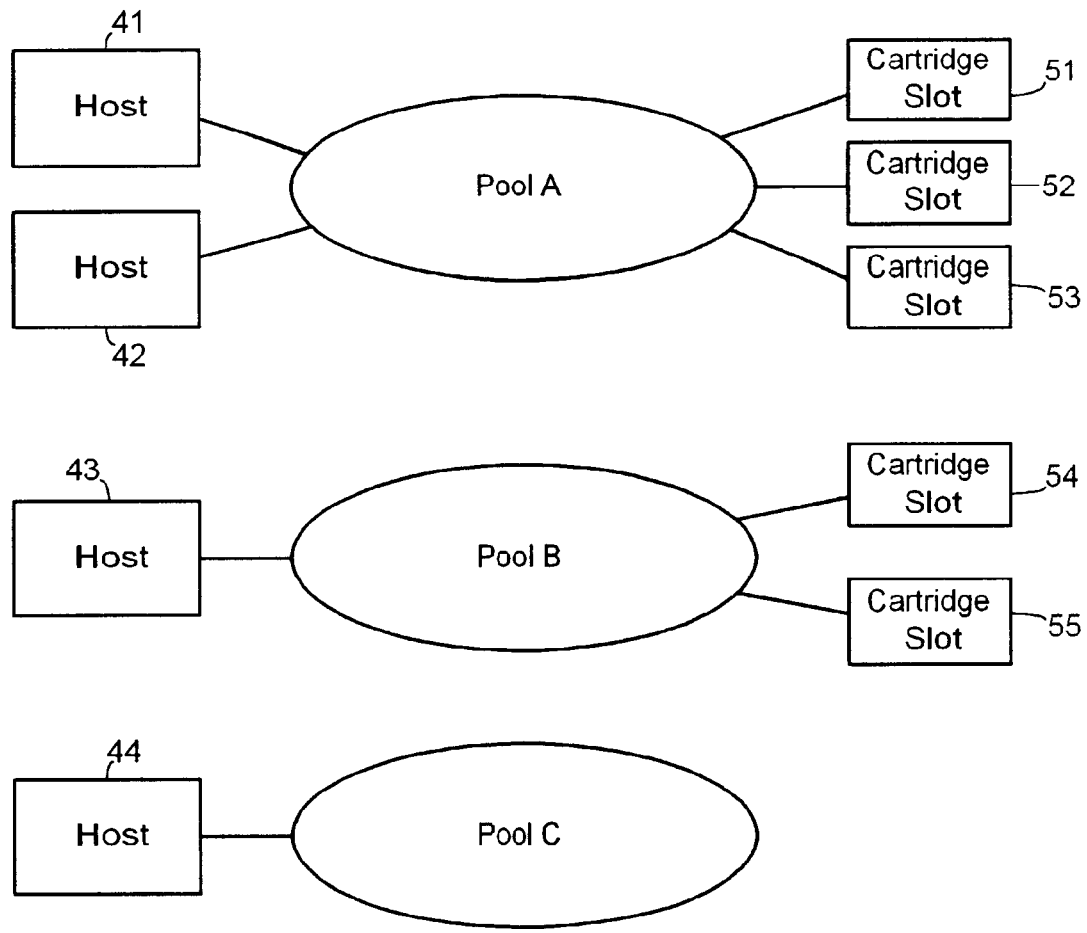
FIG. 5 is a diagram illustrating the association of hosts and cartridge slots with particular pools in one embodiment.

Referring to FIG. 5, a diagram illustrating the association of hosts and tapes with particular pools is shown. In this figure, it is assumed that hosts 41 and 42 use a first backup application, host 43 uses a second backup application and host 44 uses a third backup application. Because hosts 41 and 42 use the same backup application, and because it is assumed that the backup application will coordinate backup operations between the two hosts, no conflicts should arise between the hosts. These two hosts can therefore be assigned to a single pool (Pool A).

Host 43 is assumed to use a second backup application that is incompatible with the backup application used by hosts 41 and 42. No other hosts use the second backup application. Host 43 is therefore assigned to a separate pool (Pool B) to which no other hosts are assigned. Host 44 is assumed to use a third backup application that is incompatible with the backup application used by hosts 41 and 42, as well as the backup application used by host 43. No other hosts use the third backup application. Host 44 is therefore assigned to a pool (Pool C) to which no other hosts are assigned.

In can be seen from the figure that cartridge slots 51–53 are assigned to Pool A. Because hosts 41 and 42 are assigned to Pool A, either of these hosts can access any of cartridge slots 51–53, which are also assigned to Pool A. Since hosts 41 and 42 use the same backup application, potential conflicts between the hosts in accessing the cartridge slots should be resolved by the application before they occur. This is the case whether there are only two, or more than two hosts associated with the pool. It should also be noted that hosts 41 and 42 cannot access cartridge slots 54–55 because those cartridge slots are not assigned to their pool (Pool A).

Host 43, which is associated with Pool B, can access the cartridge slots in that pool in the same manner that hosts 41 and 42 can access the cartridge slots in Pool A. Host 43 is also prevented from accessing cartridge slots in Pools A and C in the same way hosts 41 and 42 are prevented from accessing tapes in Pools B and C.

In can be seen in FIG. 5 that host 44 is associated with a pool (Pool C) that has no cartridge slots assigned to it. While this situation will normally be temporary, it should be pointed out that it is allowed.

In this embodiment, the library partitioning filter does just that it filters out tape access commands that are not allowed.

For instance, if host 41 attempts to access tape 55, the library partitioning filter recognizes that the target tape is not in the same pool as the host that generated the command, so it rejects the command. If host 41 attempts to access tape 51, on the other hand, the access command is passed through the library partitioning filter. It should be noted that the rejection of the unauthorized access commands can be handled in various manners, such as discarding the command without notification to the host, returning an error message, etc.

The function of the library partitioning filter is to restrict access of each host to a certain portion of the library. It should be noted that this function may be performed in various other ways. For example, in another embodiment, the library partitioning filter can be configured to control access to the cartridge slots by mapping a set of logical or virtual cartridge slots to a corresponding set of physical cartridge slots. In this embodiment, the hosts do not see all of the cartridge slots in the library, but only see the set of cartridge slots that they are authorized to access (i.e., the ones in the same pool). Different hosts may thereby access what is seen by each as the same cartridge slot, when in reality, each host is accessing a different cartridge slot (assuming the hosts are associated with different pobls). This is described in more detail below.

It should be noted that the term "library partitioning filter" is used herein to describe the device, software, component or other part of the system that controls access by various hosts to cartridge slots in the tape library, whether access is controlled by literally filtering out unauthorized access commands, by mapping logical cartridge slots of the hosts to physical cartridge slots in the library, or by any other methodology. This term should therefore be liberally construed.

The cartridge slots discussed above in connection with FIG. 5 are each included in only one of the pools. While this is typical, there may be overlap between the pools. For instance, import/export elements may be shared between pools. These elements are shared (and may default to shared status until changed) because each pool typically must have access to at least one import/export slot. Otherwise, tapes could not be imported and/or exported into the respective pools. In other words, it would not be possible to add or remove tapes from a pool without an import/export slot. It is also possible to have embodiments in which certain elements (slots) are excluded by default from inclusion in a particular pool. These elements would have to be explicitly associated with each pool with which it would be used.

Figure 6:
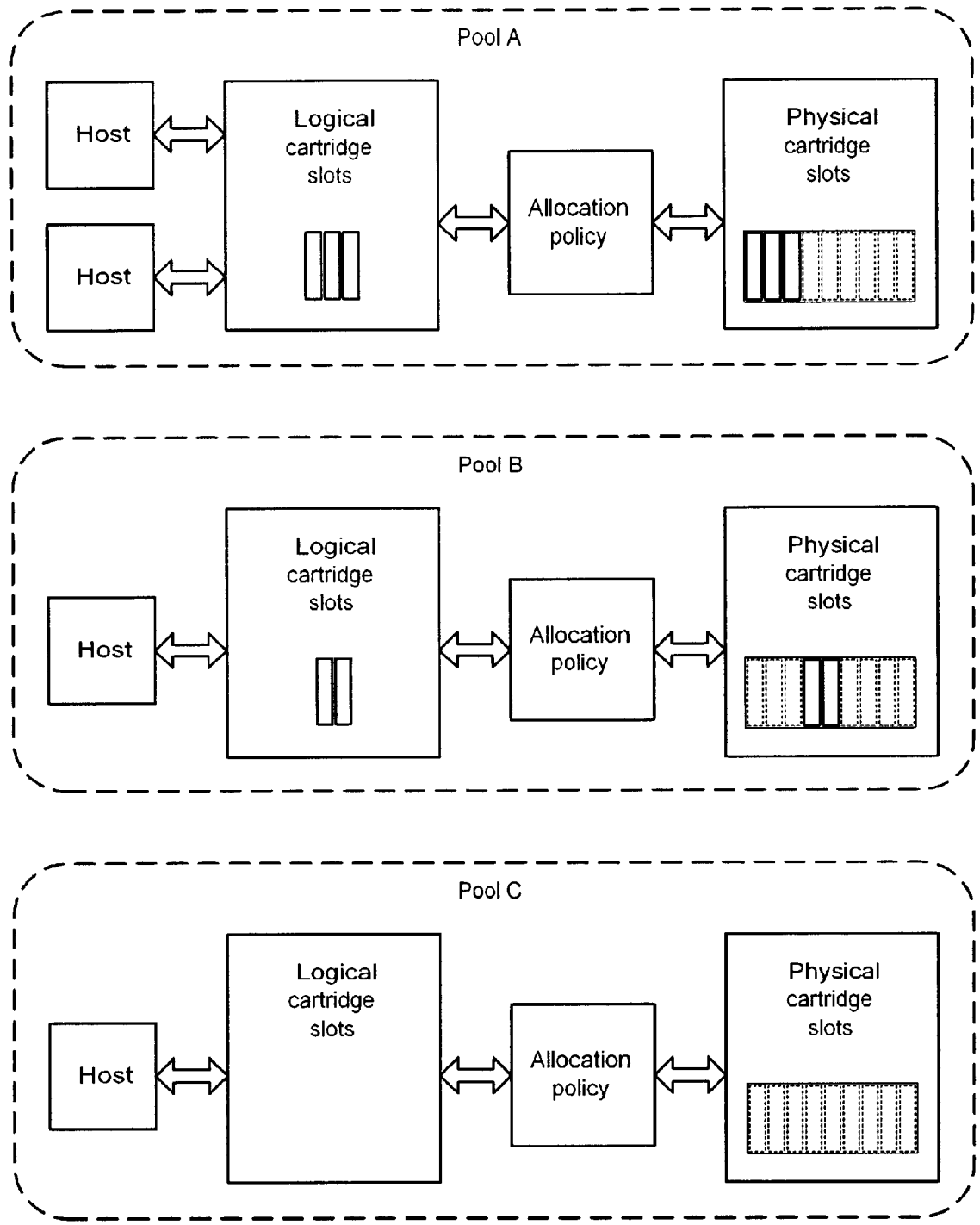
FIG. 6 is a diagram illustrating the logical-to-physical conversion of cartridge slots in the different pools in one embodiment of the invention.

Referring to FIG. 6, a diagram illustrating the logical-to-physical conversion of cartridge slots in the different pools is shown. The pools depicted in this figure correspond to the configuration shown in FIG. 5. Pool A is shown at the top of FIG. 6. As described above, hosts 41 and 42 are associated with Pool A. These hosts use applications that are compatible with each other, so the hosts can access the cartridge slots in the same way (e.g., using the same cartridge slot numbers). Hosts 41 and 42 only see the cartridge slots in Pool A (i.e., cartridge slots 51–53). These cartridge slots can be assigned any suitable logical slot numbers for identification within the pool. These logical slot numbers are mapped to physical slot numbers used by the library partitioning filter, which sees the cartridge slots in all of the pools. Any hosts that are added to Pool A see the same logical slot numbers and use the same physical cartridge slots as hosts 41 and 42.

At the center of FIG. 6, Pool B is shown. As already described, only host 43 is associated with Pool B. Host 43 sees the same logical slot numbers as hosts 41 and 42 (except that it only sees two of the slot numbers). These logical slot numbers, however, are mapped to different physical slot numbers than the logical slot numbers in Pool A, so that when host 43 accesses one of the logical slot numbers, a different physical cartridge slot is accessed than the one accessed by host 41 when it attempts to use the same logical slot number. Pool C is shown at the bottom of the figure. Because there are no cartridge slots assigned to Pool C, no cartridge slots are visible to host 44 the tape library appears to have no cartridge slots, even though it may physically contain many cartridge slots.

The library partitioning filter is shown and described above in a generic manner, i.e., as a functional block located between the hosts and the tape library. This is because the filter may be implemented in a variety of ways. For example, with respect to the position of the filter, it may be located within the SAN, between the SAN and the tape library, within the tape library or at any other location in the command flow path between the hosts and the library. Further, the filter itself may be equivalently implemented in a number of ways. For instance, it may be incorporated into a switching device, built into the SAN, constructed as a separate piece of hardware, and so on. The filter may be implemented in hardware, firmware or software and may be broken into functional components or integrated into a single component or device. It should also be noted that the filter may operate strictly as a filter (i.e., rejecting some access commands while passing others) or it may operate as a mapping (logical to physical) device, as described above.

Figure 7:
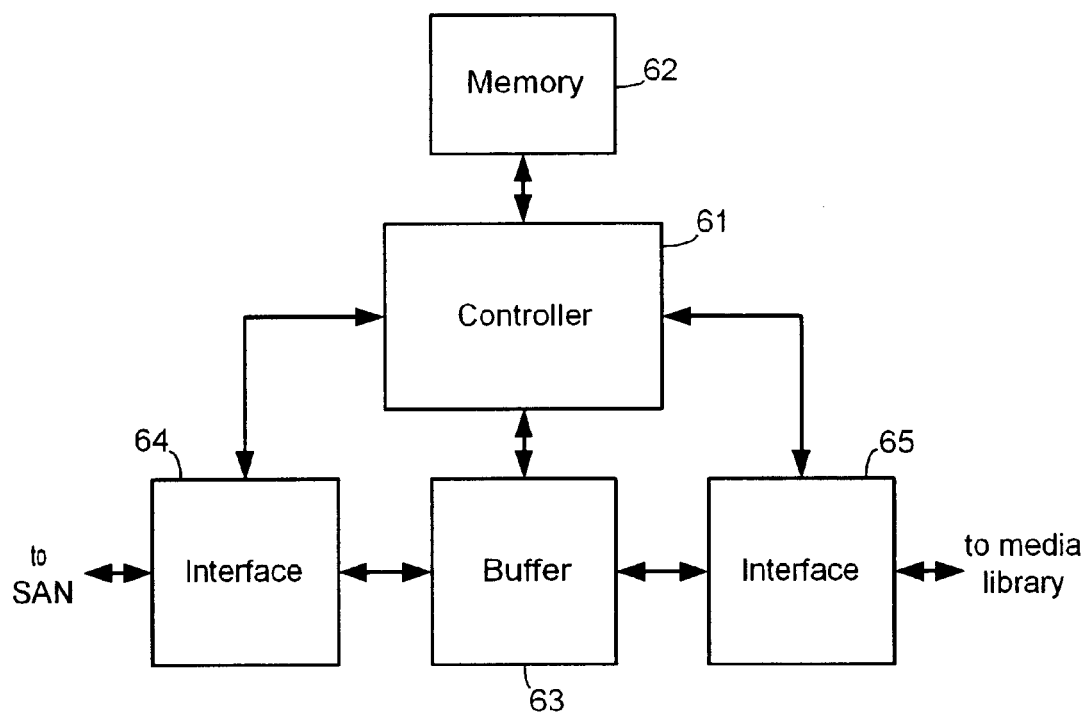
FIG. 7 is a diagram illustrating the structure of a library partitioning filter in one embodiment of the invention.

Referring to FIG. 7, an exemplary embodiment of a device in accordance with the present disclosure is shown. This device operates as a filter and is configured to be located between a SAN and a tape library. The device comprises a controller 61 that is coupled to a memory 62, a buffer 63, and two interfaces 64 and 65. Interface 64 is configured to be coupled to a first transport medium, such as a Fibre Channel fabric of a SAN. Interface 65 is configured to be coupled to the tape library. Access commands directed to the tape library are received via interface 64 and are stored in buffer 63. Controller 61 examines the received commands and determines whether to pass or reject the individual commands based upon configuration information stored in memory 62. The configuration information defines the relationships between the pools and the hosts and cartridge slots with which they are associated. If the controller determines that a received access command is targeted to a cartridge slot that is associated with the same pool as the host that generated the command, controller 61 passes the command from buffer 63 through interface 65 to the tape library. If the controller determines that the received command is not targeted to a cartridge slot that is associated with the same pool, the command is discarded. In this case, the controller may be configured to return an error message to the host to notify it that the command was rejected.

As indicated above, the configuration of the filter may differ in other embodiments. For example, if the filter is implemented integrally with the tape library, the interfaces could be modified or eliminated, the memory could be shared with other components, and so on.

It is contemplated that the library partitioning device will also include an interface for the administration or management of the device. This interface may be coextensive with one of the other interfaces, or may be separate. A system administrator can configure the pools and associated hosts/cartridge slots as needed. This may include establishing new pools, assigning cartridge slots to pools, assigning hosts to pools, etc.

In addition to hardware embodiments, the library partitioning filter may be implemented in software (or firmware). In this instance, the filter functionality is embodied in a set of instructions that are configured to cause a data processing device to perform the operations described above. The data processing device may comprise a general purpose or specialized computer, a switch, a router or some other device that is capable of being programmed to perform the necessary operations. The instructions may be stored in memories (e.g., RAM), in storage devices (e.g., hard disk drives), or on suitable media (e.g., floppy disks, CD-ROMs, DVD-ROMs, magnetic tapes, etc.). A memory, medium, storage device or other means for storing the instructions is intended to be encompassed by this disclosure.

It should also be noted that the present systems and methods may be implemented with respect to libraries of media other than magnetic tapes. For example, the media library may comprise a plurality of CD-ROMS, DVD-ROMs or removable hard drives. Further, the media in the library may contain any type of information, including but not limited to raw data, audio and video.

Although the foregoing descriptions focus on the handling of library commands that move the media from one element (slot) to another, it should be noted that other commands may also need to be filtered to generate an appropriate response. For example, if a host issues a command to report the number of elements contained in the library, the library partitioning filter may have to generate a response based upon the identity of the host that issued the command.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:

receiving a media library access command from a host;

determining whether the received command is directed to a portion of the media library which is accessible to the host based on media library access information;

if the received command is directed to a portion of the media library which is accessible to the host, forwarding the received command to the media library;

if the received command is not directed to a portion of the media library which is accessible to the host, blocking the received command from the media library; and receiving user commands for modifying the media library access information at a management interface.

2. The method of claim 1, further comprising associating each of a plurality of hosts with a corresponding one of a plurality of pools, wherein each of the plurality of pools includes a corresponding portion of the media library.

3. The method of claim 2, wherein the pools are non-overlapping.

4. The method of claim 3, wherein more than one host is associated with at least one of the pools.

5. The method of claim 1, further comprising returning an error message if the received command is not directed to a portion of the media library which is accessible to the host.

6. The method of claim 1, wherein forwarding the received command to the media library comprises forwarding the received command to a robot controller of the media library.

7. The method of claim 1, further comprising mapping one or more virtual elements for each host to corresponding physical elements in the media library.

8. The method of claim 7, wherein at least a portion of the one or more virtual elements are common to hosts associated with different portions of the media library.

9. The method of claim 1, wherein forwarding the received command to the media library comprises modifying the received command based upon the identity of the host and forwarding the modified command to the media library.

10. The method of claim 1, wherein the media library comprises a tape library.

11. A software application comprising one or more instructions, wherein the instructions are configured to cause a data processor to perform the method comprising:
    maintaining a list of pools based on media library access information, wherein each pool includes a portion of a media library and wherein each pool is associated with one or more hosts;
    identifying a source host from which a media library access request is received;
    identifying a target portion of the media library that is the target of the access request;
    identifying a target pool that includes the target portion of the media library;
    determining whether the source host is associated with the target pool;
    allowing the requested access if the source host is associated with the target pool and preventing the requested access if the source host is not associated with the target pool; and
    receiving user commands for modifying the media library access information at a management interface.

12. The software application of claim 11, wherein the method further comprises associating each of a plurality of hosts with a corresponding one of a plurality of pools, wherein each of the plurality of pools includes a corresponding portion of the media library.

13. The software application of claim 12, wherein the pools are non-overlapping.

14. The software application of claim 12, wherein more than one host is associated with at least one of the pools.

15. The software application of claim 11, wherein allowing the requested access comprises modifying the access request based upon the identity of the host and allowing the modified access to the media library.

16. The software application of claim 11, wherein forwarding the received command to the media library comprises forwarding the received command to a robotic controller of the media library.

17. The software application of claim 11, wherein the method further comprises mapping one or more virtual media for each host to corresponding physical media in the media library.

18. The software application of claim 17, wherein at least a portion of the one or more virtual media are common to hosts associated with different portions of the media library.

19. An apparatus comprising:
    a controller configured to be coupled between a media library and a host device;
    a memory coupled to the controller; and
    a management interface coupled to the controller;
    wherein the memory is configured to store media library access information,
        wherein the media library access information identifies a plurality of pools,
        wherein each pool contains a portion of the media library and wherein each of a plurality of host devices is associated with one of the pools;
    wherein the controller is configured to allow each host device to access only the portion of the media library with which the host device is associated; and
    wherein the management interface is configured to receive user commands for modifying the media library access information.

20. The apparatus of claim 19, wherein the controller and memory are contained in a media library system.

21. The apparatus of claim 19, wherein the pools are non-overlapping.

22. apparatus of claim 19, wherein the controller is configured to modify certain access requests based upon the identity of the host requesting access and to allow the modified access to the media library.

23. The apparatus of claim 19, wherein the media library comprises a tape library.

24. The apparatus of claim 19, wherein each host device has a backup application which is used to access the media library, wherein the host devices use at least two incompatible backup applications and wherein each host device that uses a first one of the incompatible backup applications is associated with a first pool and each host device that uses a second one of the incompatible backup applications is associated with a second pool.

25. The apparatus of claim 24, wherein each backup application is configured to resolve access conflicts between host devices that use the backup application.

26. The apparatus of claim 19, wherein the controller is configured to map one or more virtual media for each host to corresponding physical media in the media library.

27. An apparatus comprising:
    a first interface configured to be coupled to a first transport medium;
    a second interface configured to be coupled to a second transport medium;
    a controller coupled to the first and second interfaces and configured to
        receive media library access commands via the first interface,
        identify a source and a target corresponding to each media library access command,
        determine whether the target is authorized to be accessed by the source, and
        forward the media library access command to the target only if the target is authorized to be accessed by the source; and
    a management interface coupled to the controller and configured to receive user commands for modifying the media library access information.

28. The apparatus of claim 27, wherein determining whether the target is authorized to be accessed by the source comprises determining whether the source is associated with a pool containing the target.

29. The apparatus of claim 27, wherein the controller is configured to map one or more virtual media for each host to corresponding physical media in the media library.

30. The apparatus of claim 27, further comprising a memory coupled to the controller and configured to store media library access information, wherein the media library access information identifies a plurality of pools, wherein each pool contains a portion of the media library and wherein each of a plurality of host devices is associated with one of the pools.

31. A method comprising:
receiving a media library access command from a host;
determining whether the received command is directed to a portion of the media library which is accessible to the host;
if the received command is directed to a portion of the media library which is accessible to the host, forwarding the received command to the media library, wherein forwarding the received command to the media library comprises modifying the received command based upon the identity of the host and forwarding the modified command to the media library; and
if the received command is not directed to a portion of the media library which is accessible to the host, blocking the received command from the media library.

32. A software application comprising one or more instructions, wherein the instructions are configured to cause a data processor to perform the method comprising:
maintaining a list of pools, wherein each pool includes a portion of a media library and wherein each pool is associated with one or more hosts;
identifying a source host from which a media library access request is received;
identifying a target portion of the media library that is the target of the access request;
identifying a target pool that includes the target portion of the media library;
determining whether the source host is associated with the target pool; and
allowing the requested access if the source host is associated with the target pool and preventing the requested access if the source host is not associated with the target pool, wherein allowing the requested access comprises modifying the access request based upon the identity of the host and allowing the modified access to the media library.

33. An apparatus comprising:
a controller configured to be coupled between a media library and a host device; and
a memory coupled to the controller and configured to store media library access information, wherein the media library access information identifies a plurality of pools, wherein each pool contains a portion of the media library and wherein each of a plurality of host devices is associated with one of the pools;
wherein the controller is configured to allow each host device to access only the portion of the media library with which the host device is associated, to modify certain access requests based upon the identity of the host requesting access, and to allow the modified access to the media library.

34. An apparatus comprising:
a first interface configured to be coupled to a first transport medium;
a second interface configured to be coupled to a second transport medium;
a controller coupled to the first and second interfaces and configured to receive media library access commands via the first interface,
identify a source and a target corresponding to each media library access command,
determine whether the target is authorized to be accessed by the source,
modify certain media library access commands based upon the identity of the host submitting the command, and
forward the modified media library access command to the target only if the target is authorized to be accessed by the source.

35. A method comprising:
receiving media library access commands from one or more hosts that use at least two incompatible backup applications, wherein each host device that uses a first one of the incompatible backup applications is associated with a first pool and each host device that uses a second one of the incompatible backup applications is associated with a second pool;
determining whether the received commands are directed to a portion of the media library which is accessible to the respective hosts;
if the received commands are directed to portions of the media library which are accessible to the respective hosts, forwarding the received commands to the media library; and
if the received commands are not directed to portions of the media library which are accessible to the respective hosts, blocking the received commands from the media library.

36. The method of claim 35, wherein each backup application is configured to resolve access conflicts between host devices that use the backup application.

37. An apparatus comprising:
a controller configured to be coupled between a media library and a host device; and
a memory coupled to the controller and configured to store media library access information, wherein the media library access information identifies a plurality of pools, wherein each pool contains a portion of the media library and wherein each of a plurality of host devices is associated with one of the pools;
wherein the controller is configured to allow each host device to access only the portion of the media library with which the host device is associated; and
wherein each host device has a backup application which is used to access the media library, wherein the host devices use at least two incompatible backup applications and wherein each host device that uses a first one of the incompatible backup applications is associated with a first pool and each host device that uses a second one of the incompatible backup applications is associated with a second pool.

38. The apparatus of claim 37, wherein each backup application is configured to resolve access conflicts between host devices that use the backup application.

* * * * *